(12) United States Patent
Wojsznis et al.

(10) Patent No.: US 6,847,954 B1
(45) Date of Patent: Jan. 25, 2005

(54) CONTROL-LOOP AUTO-TUNER WITH NONLINEAR TUNING RULES ESTIMATORS

(75) Inventors: Wilhelm K. Wojsznis, Round Rock, TX (US); Terrence L. Blevins, Round Rock, TX (US); Dirk Thiele, Austin, TX (US)

(73) Assignee: Fisher Rosemount Systems, Inc., Austin, TX (US)

( * ) Notice: Subject to any disclaimer, the term of this patent is extended or adjusted under 35 U.S.C. 154(b) by 391 days.

(21) Appl. No.: 09/644,399

(22) Filed: Aug. 23, 2000

Related U.S. Application Data

(60) Provisional application No. 60/150,323, filed on Aug. 23, 1999.

(51) Int. Cl.[7] ............................ G05B 13/02; G05E 1/00; G05E 3/00; G05F 15/18; G05G 7/00
(52) U.S. Cl. .............................. 706/23; 706/14; 706/2; 700/50
(58) Field of Search .............................. 706/23, 14, 2; 700/50

(56) References Cited

U.S. PATENT DOCUMENTS

| | | | | |
|---|---|---|---|---|
| 4,754,391 A | | 6/1988 | Suzuki ........................ | 700/37 |
| 4,758,943 A | * | 7/1988 | Astrom et al. ................. | 700/37 |
| 5,453,925 A | | 9/1995 | Wojsznis et al. .............. | 700/37 |
| 5,742,503 A | | 4/1998 | Yu ............................... | 700/42 |
| 5,748,467 A | * | 5/1998 | Qin et al. ..................... | 700/50 |

FOREIGN PATENT DOCUMENTS

| | | |
|---|---|---|
| JP | 63-94304 | 4/1988 |
| JP | 14-28006 | 2/1994 |
| JP | 9-244703 | 9/1997 |
| WO | WO 99/19778 | 4/1999 |

OTHER PUBLICATIONS

Willy K. Wojsznis et al; Neural Network Assisted Control Loop Tuner; IEEE; 0–7803–5446–X; 427–431.*
Notice of the Reason of Rejection issued in JP 2000–252805 application by the Japanese Patent Office transmitted to applicants' agent Mar. 18, 2003.

* cited by examiner

Primary Examiner—Anthony Knight
Assistant Examiner—Joseph P. Hirl
(74) Attorney, Agent, or Firm—Marshall, Gerstein & Borun LLP

(57) ABSTRACT

A system for tuning a process control loop includes a tuner module for receiving an error signal representative of the difference between a set point and a process variable, the module generating a first process control signal for controlling the process. The system further includes a controller module for receiving the error signal and a parameter signal from a nonlinear module to generate a second process control signal for controlling the process, wherein the nonlinear module applies a nonlinear procedure to generate the parameter signal. The system further includes a switching means coupled to the tuner module and the controller module to select the appropriate process control signal for controlling the process. The system provided uses nonlinear techniques in the nonlinear module to approximate the desired controller tuning parameters. The nonlinear techniques include neural network tuning, fuzzy logic tuning and nonlinear functions, including sigmoid tuning. A system also provides that the nonlinear module use nonlinear techniques to approximate the desired process model parameters. According to an embodiment of the present invention, the nonlinear module includes a process model identification module and a controller tuning module that provides controller parameters and model identification parameters using neural networks, fuzzy logic and nonlinear functions, including sigmoid tuning.

19 Claims, 13 Drawing Sheets

CONTROL-LOOP AUTO-TUNER WITH NONLINEAR TUNING RULES ESTIMATORS

CROSS REFERENCE TO RELATED APPLICATIONS

This Application claims the benefit of priority based on Provisional Patent Application No. 60/150,323, entitled "Control Loop Auto-Tuner With Nonlinear Tuning Rules Estimators," by the same inventors as this Application and filed on Aug. 23, 1999.

BACKGROUND OF THE INVENTION

1. Field of the Invention

The present invention relates to a system and method for tuning a process controller using nonlinear tuning rules estimators, including neural networks and fuzzy logic.

2. Description of the Related Art

A Proportional, Integral, Derivative (PID) controller is a common controller used in industrial processes, including computer-controlled industrial processes. Such PID controllers and their variations and combinations, such as P, PI, PD, have enjoyed wide-spread application in the control of industrial processes. Typical industrial processes are controlled by one or more feedback loops incorporating PID controllers.

A fuzzy logic controller (FLC) is also a known process controller used to control process parameters by maintaining process variables within parameters related to desired set point values. FLCs are nonlinear controllers and are becoming more widely used in industrial environments.

One type of known method for parameter tuning of a PID controller is the Ziegler-Nichols method. Relay-oscillation autotuning is also a well-known and recognized tuning technique. Relay-oscillation tuning identifies the Ultimate Gain and Ultimate Period of a process. PID controller settings can be determined from these parameters using Ziegler-Nichols rules and modifications. An extension of the relay-oscillation tuning technique that goes beyond identifying the Ultimate Gain and Ultimate Period is provided in U.S. Pat. No. 5,453,925, "System and Method for Automatically Tuning a Process Controller", to Wilhelm K. Wojsznis and Terrance L. Blevins, (hereinafter Wojsznis), which is hereby incorporated by this reference, in its entirety, into this patent application.

In recent years, significant progress has been made with model-based tuning and, in particular, with Internal Model Control (IMC) and Lambda tuning. Both approaches result in a first-order closed loop response to setpoint changes. A tuning parameter relating to the speed of response is used to vary the tradeoff between performance and robustness. Both methods adjust the PID controller reset (or reset and rate) to cancel the process pole(s) and adjust the controller Gain to achieve the desired closed-loop response. IMC and Lambda tuning have become popular because oscillation and overshoot are avoided and control performance can be specified in an intuitive way through the closed-loop time constant.

One of the limitations of model-based tuning is the need for process model identification. An equivalent first-order plus Dead Time process model with parameters of Static Gain, Apparent Dead Time, and Apparent Time Constant is usually identified for self-regulating processes. For integrating processes, model parameters of Process Integral Gain and Dead Time are determined. Model identification is typically made by an open-loop step test. Compared to the relay-oscillation method, open-loop methods are not easy to automate. With open-loop methods, human intervention is often required to assure an accurate model due to nonlinearities in the process, valve hysteresis, and load disturbances. A different technique is required for self-regulating and integrating processes.

What is needed is a system and method for tuning in a relay oscillation environment that provides necessary PID tuning parameters over all ranges of model parameters and identifies model parameters of a process.

SUMMARY OF THE INVENTION

Accordingly, a system for tuning a process control loop is provided. The system includes a tuner module for receiving an error signal representative of the difference between a set point and a process variable, the module generating a first process control signal for controlling the process. The system further includes a controller module for receiving the error signal and a parameter signal from a nonlinear module to generate a second process control signal for controlling the process, wherein said nonlinear module applies a nonlinear procedure to generate the parameter signal. The system further includes a switching means coupled to the tuner module and the controller module to select the appropriate process control signal for controlling the process.

The system provided uses nonlinear approaches in the nonlinear module to approximate the desired controller tuning parameters. The nonlinear approaches include neural network tuning, fuzzy logic tuning and nonlinear functions, including sigmoid tuning.

A system also provides that the nonlinear module use nonlinear approaches to approximate the desired process model parameters. According to an embodiment of the present invention, process model identification is obtained using neural networks, fuzzy logic and nonlinear functions, including sigmoid tuning which beneficially give better model parameters than prior known analytical formulas for relay-oscillation identification.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
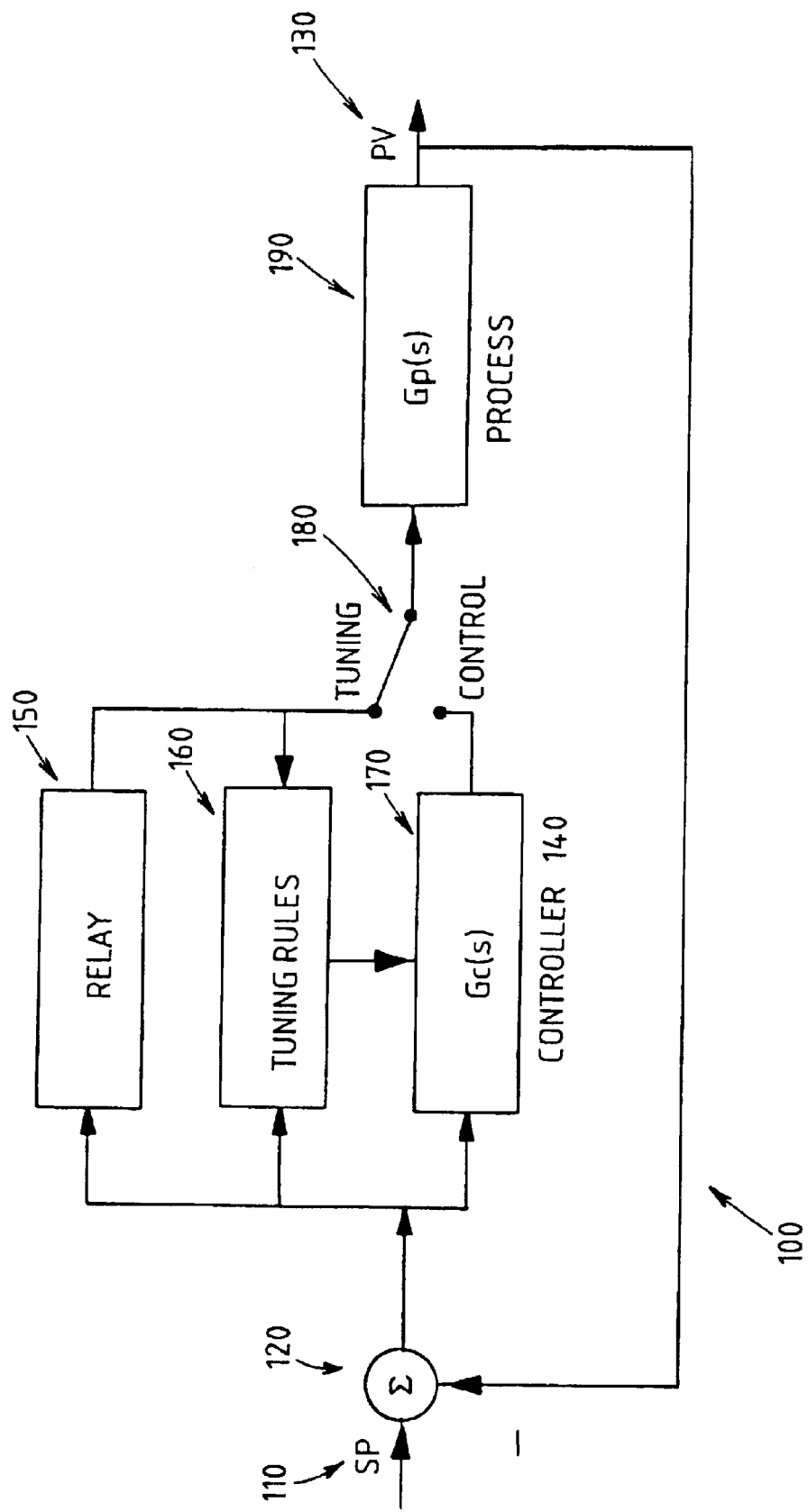
FIG. 1A is a block diagram schematic of a relay-oscillation tuning system in accordance with the present invention.

Referring to FIG. 1A, a schematic block diagram of a relay-oscillation tuner system 100 is presented that may be controlled in accordance with new nonlinear approaches. Process 190 may include any controllable process. An output signal, shown as process variable (PV) 130, is provided by process 190 and applied to one input of summer 120, where PV is compared to a set point (SP) 110. The difference between PV and SP is used in relay-oscillation tuner system 100 to determine the Ultimate Gain $K_u$ and Ultimate Period $T_u$ for a process. As shown, relay-oscillation tuner system 100 includes a summer 120, a relay 150, and tuning rules 160. The set point (SP) 110 is provided to summer 120, together with process variable (PV) 130. Summer 120 subtracts PV from SP, providing the result to relay 150, tuning rules 160 and controller 170. Tuning of the process takes place either automatically or under user control. Tuning of the process 190 optionally may include an automatic controlled self-oscillation tuning procedure, such as the procedure described in Wojsznis. The self-oscillation procedure includes controlling switch 180 to either couple the output of controller 170 to process 190 or to couple the output of the relay 150 to the process 190. In one embodiment, relay 150 performs the self-oscillation procedure, with tuning rules 160 controlling switch 180. Switch 180 either couples controller 140 to process 190 or couples tuning rules 160 and relay 150 to process 190. The procedure is an oscillating procedure that determines a time delay, Ultimate Gain and Ultimate Period.

An Apparent Dead Time, Td, is determined at tuning initialization. Td is determined by applying a tangent from the slope of the process output PV 130 during tuning initialization. The tangent is extrapolated to intercept the set point SP or mean value line of the process output before tuning. The time between the initial relay step and this intercept is the Apparent Dead Time. Other methods for determining Td are also within the scope of the present invention. Such other methods include those provided in Wojsznis.

Figure 1B:
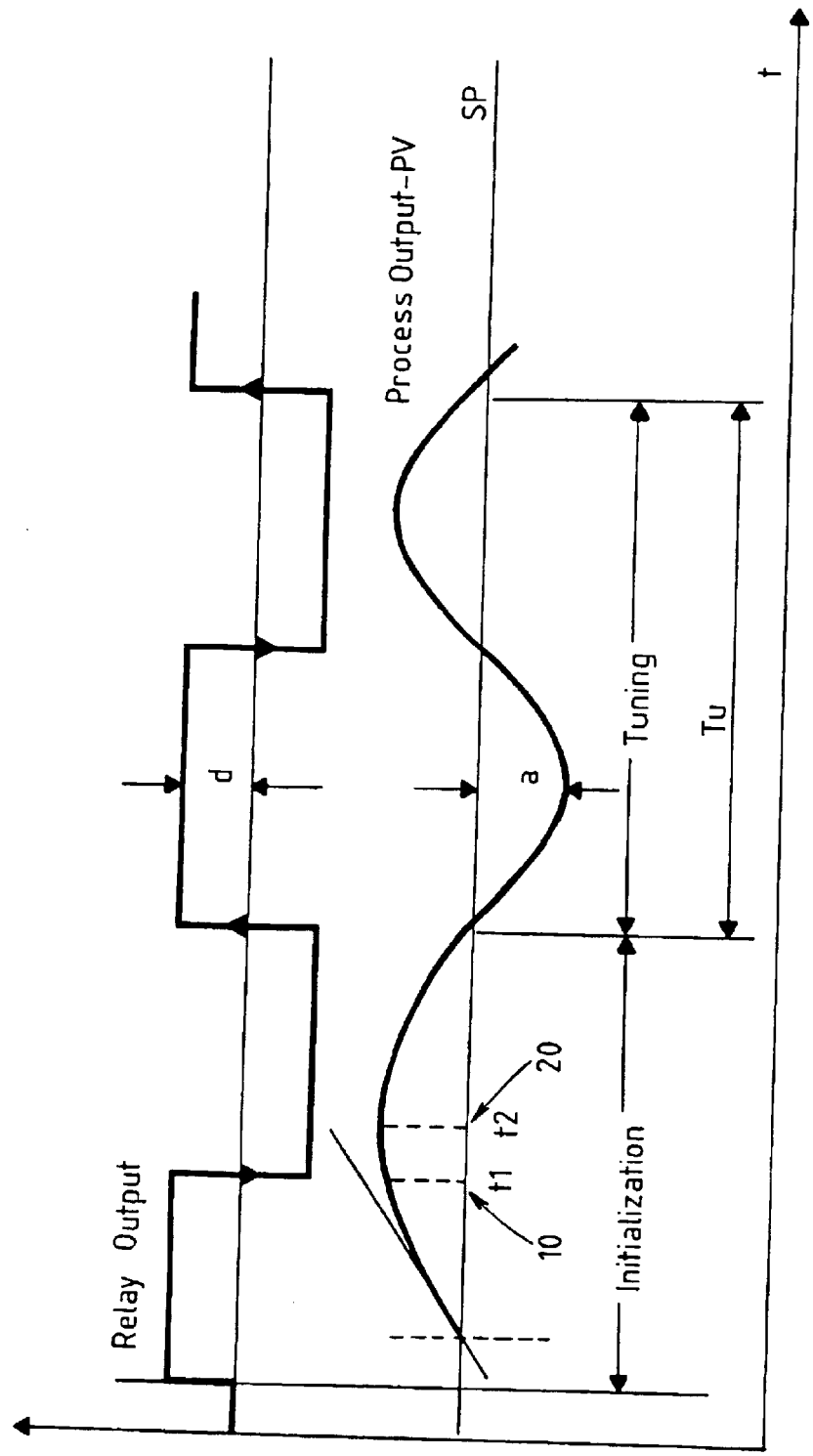
FIG. 1B is tuning plot according to an embodiment of the present invention.

FIG. 1B represents a graph of the process input and process output signals during parts of the oscillation procedure. The time duration between time t1 (10), at which relay 150 switches, and the time t2 (20), at which the process output reaches the maximum, approximates the Dead Time. The Dead Time may be otherwise computed as a difference between the time of |SP–PV| increment and the time of |SP–PV| decrement. The evaluation time with this approach takes one or more Ultimate Periods (Tu). The apparent Dead Time may be calculated as the average of the two or three results.

The Dead Time, Ultimate Gain, and Ultimate Period are sufficient to calculate a first-order plus Dead Time process model. Equations (1) and (2) for calculating first order plus Dead Time are:

$$T_c = \frac{T_u}{2\pi} \tan\left(\pi - \frac{2\pi T_d}{T_u}\right) \qquad (1)$$

$$K_s = \frac{1}{K_u} \sqrt{1 + \frac{4\pi^2 T_c^2}{T_u^2}} \qquad (2)$$

where $T_c$=process time constant $T_u$=ultimate period $T_d$=process apparent Dead Time $K_s$=process static gain $K_u$=ultimate gain The process time constant, $T_c$, in Equation (1) is expressed as a tangent function, resulting in a good approximation for the arguments less than $\pi/3$, when the Dead Time is relatively large in relation to the time constant. For processes with insignificant Dead Time, a significant error results in the time constant computation, even for a small error in Dead Time identification. This is because the tangent argument is close to $\pi/2$, and small error in argument gives a large error in tangent value. Some improvement is achieved by using a linear function shown in Equation (3) for the arguments greater than $\pi/3$:

$$T_c = \frac{T_u}{2\pi}\left(\tan\frac{\pi}{3} + 2\left(\pi - \frac{2\pi T_d}{T_u} - \frac{\pi}{3}\right)\right) \qquad (3)$$

Ziegler-Nichols (ZN) Rules for PID Controller Tuning

Relay-oscillation tuning naturally matches ZN rules and provides the Ultimate Gain, $K_u$ and Ultimate Period, $T_u$. The original ZN formulas for PI controllers are provided by the formulas:

$K=0.4K_u$ and $T_i=0.8T_u$

These formulas give a Phase margin that varies greatly from about 20 degrees to 90 degrees, depending on the ratio $\tau$ of the Process Dead Time L to the Process Time Constant T. Consequently, performance varies greatly from an extremely oscillatory response for a process with a ratio close to 0.1 to an extremely sluggish response for a process with a ratio close to 1.0.

A PID controller tuned with the original ZN rules, $K=0.6K_u$, $T_i=0.5T_u$, and $T_d=0.125T_u$, experiences similar behavior. Various modifications of the original formula have been proposed to address the problem. One tendency is to make Gain smaller and Integral Time shorter, according to the formulas:

$K=0.4K_u$, $T_i=\frac{1}{3}T_u$, and $T_d=\frac{1}{12}T_u$

The above modification improves performance for loops with $\tau$ close to 0.5, but loops with small values of $\tau$ become even more oscillatory.

Other more flexible approaches are provided in Equations (4), (5) and (6) and establish the Phase/Gain margin design:

$$T_i = \frac{T_u}{4\pi\alpha}(\tan\phi + \sqrt{4\alpha + \tan^2\phi}) \quad (4)$$

$$T_d = \alpha T_i \quad (5)$$

$$K = \frac{K_u \cos\phi}{G_m} \quad (6)$$

where:

$\alpha$ is the design selection of the ratio $T_d{:}T_i$ with the default value 0.15;

$G_m$ is the desired Gain margin with the default value 2.0;

$\phi$ is the Phase margin; and $K$, $T_d$, and $T_i$ are the controller parameters.

With a specified Phase and Gain margin, Equation (7) provides constant coefficients to compute $T_i$, $T_d$ and K from $T_u$ and $K_u$. A typical design of $\phi=45°$ gives the following coefficients:

$$K=0.38K_u, T_i=1.2T_u, \text{ and } T_d=0.18T_u \quad (7)$$

This design is suitable for small $\tau$, but gives an extremely sluggish response for $\tau$ higher than 0.2.

Assuming the Phase margin $\phi=33°$ and Gain margin=3.0, the following coefficients result in Equation (8):

$$K=0.27K_u, T_i=0.87T_u, \text{ and } T_d=0.13T_u; \quad (8)$$

These coefficients are suitable to design for a narrow range $\tau$ in the neighborhood of 0.25.

A further known modification includes defining controller parameters as functions of normalized Dead Time $$\frac{L}{L+T}$$

or normalized Gain $$\kappa = \frac{1}{K_p K_u},$$

where $K_p$ is Process Static Gain. However, the above approach uses both Dead Time and Time Constant, or the Static Gain of the process. Therefore, it cannot be used directly with relay-oscillation tuning.

Nonlinear Tuning Rules Estimators

In the development of tuning rules estimators, certain assumptions and considerations are be taken into account. First, all input parameters (Ultimate Gain, Ultimate Period and Dead Time) are obtained during the relay-oscillation test. Second, the major deficiency of Ziegler-Nichols rule is an inadequate controller Integral Time for processes with small Dead Time and excessive Integral Time for processes with a significant Dead Time. Third, tuning rules should result in controller tuning parameters and responses close to model-based tuning (IMC or Lambda).

The relay-oscillation tuning test illustrated in FIGS. 1A and 1B, and described in the corresponding discussion, provides for the Ultimate Gain $K_u$ and Ultimate Period $T_u$. To overcome the deficiencies of ZN rules, nonlinear estimators have been found to effect an improvement in defining tuning parameters.

A sigmoid expression provides a smooth transition between two different values, and is used for developing nonlinear estimator. The following mathematical relationships satisfy the above requirements:

$$T_i=f_1(T_u,L)T_u; K=f_2(T_u,L)K_u; T_d=d1T_i; \quad (9)$$

$$f_1(T_u,L) = a1 + \frac{b1}{1 + \exp-\left(\frac{T_u}{L}-c1\right)/d2} \quad (10)$$

$$f_2(T_u, L)=a2+(b2-f1(T_u, L))/c2 \quad (11)$$

where a1, a2, b1, b2, c1, c2 are heuristic coefficients, and where a1 is in the range 0.3 to 0.4, a2 is in the range 0.25 to 0.4, b1=0.6, b2=1.0, c1=7.0, c2=4.0, d1=0.125, d2=1.0

Figure 1C:
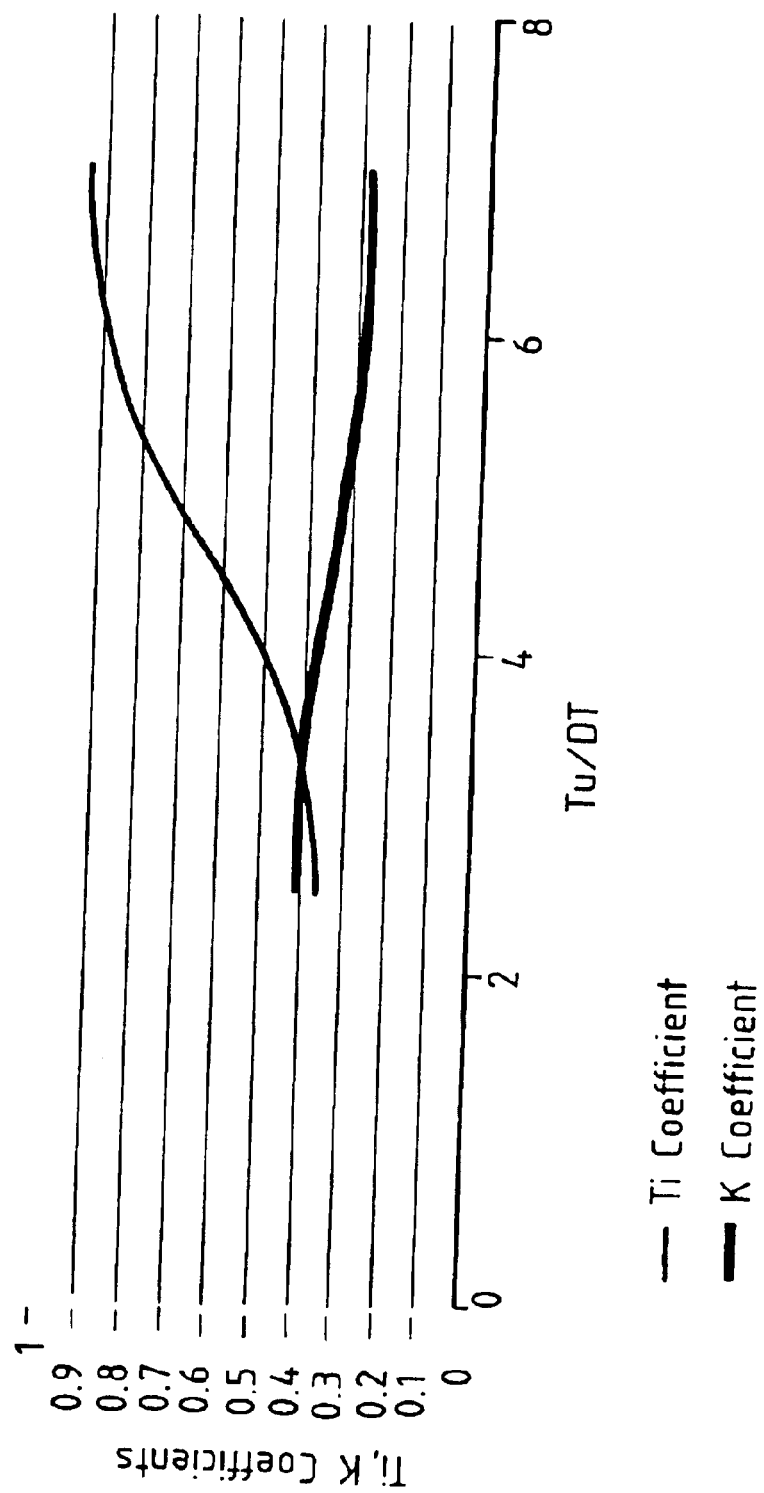
FIG. 1C is a graph showing Nonlinear Coefficient Functions for Computing Controller Integral Time and Gain.

Equation (10) gives the value of the coefficient used for the $T_i$ computation, which varies from a minimal value of a1 to a maximum value of a1+b1, as shown in FIG. 1C. Equation (11) provides an adjustment of the coefficient for K computation in the range $$[a2+(b2-a1-b1), a2+(b2-a1)].$$

Figure 2:
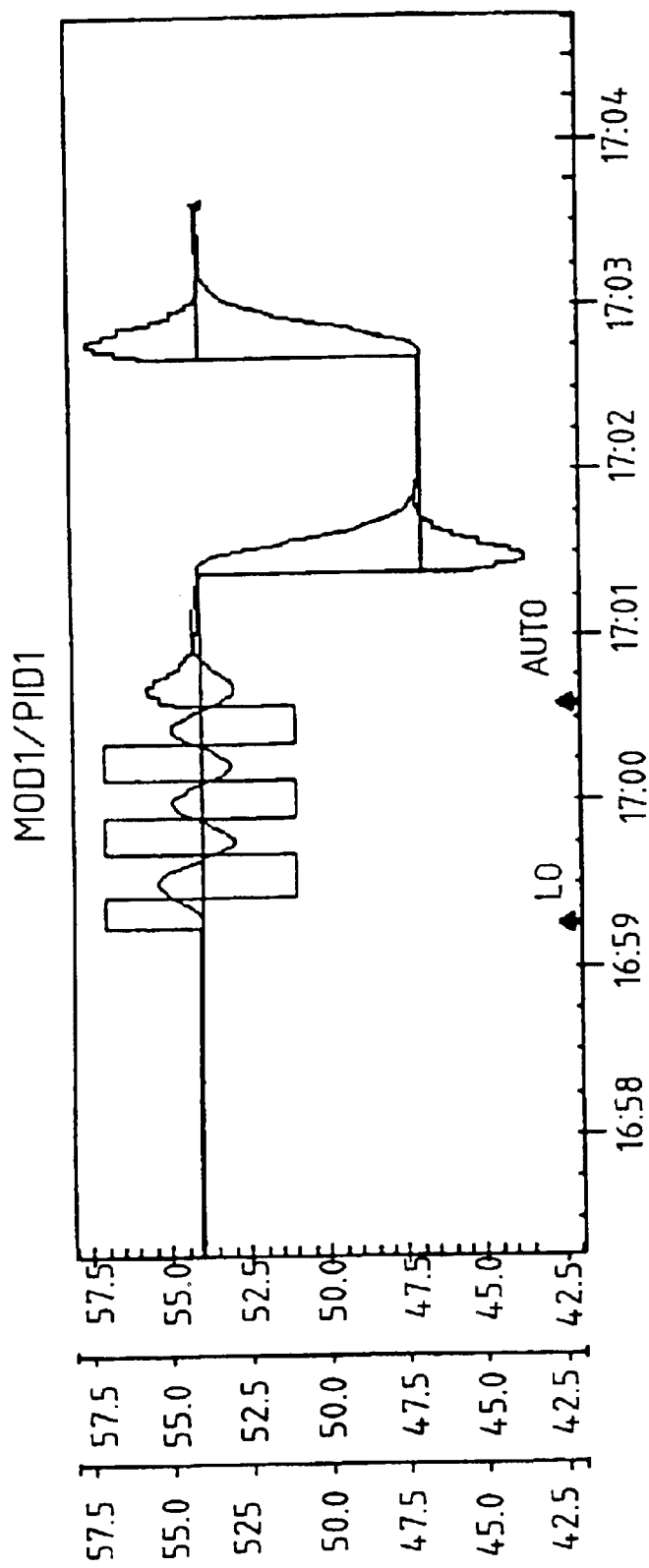
FIG. 2 is a graph showing tuning and step responses for the process with L/T≡0.2 and Loop Scan=0.1 sec.

This approach results in significantly improved tuning responses, close to the IMC or Lambda tuning, rather than to the ZN quarter amplitude decay. Some typical step responses for various L/T are shown in FIGS. 2 though 5. An example of loop tuning and loop step response for a second-order process with Gain=1, T1=10 sec, T2=3 sec, L=2 sec is shown in FIG. 2.

Figure 3:
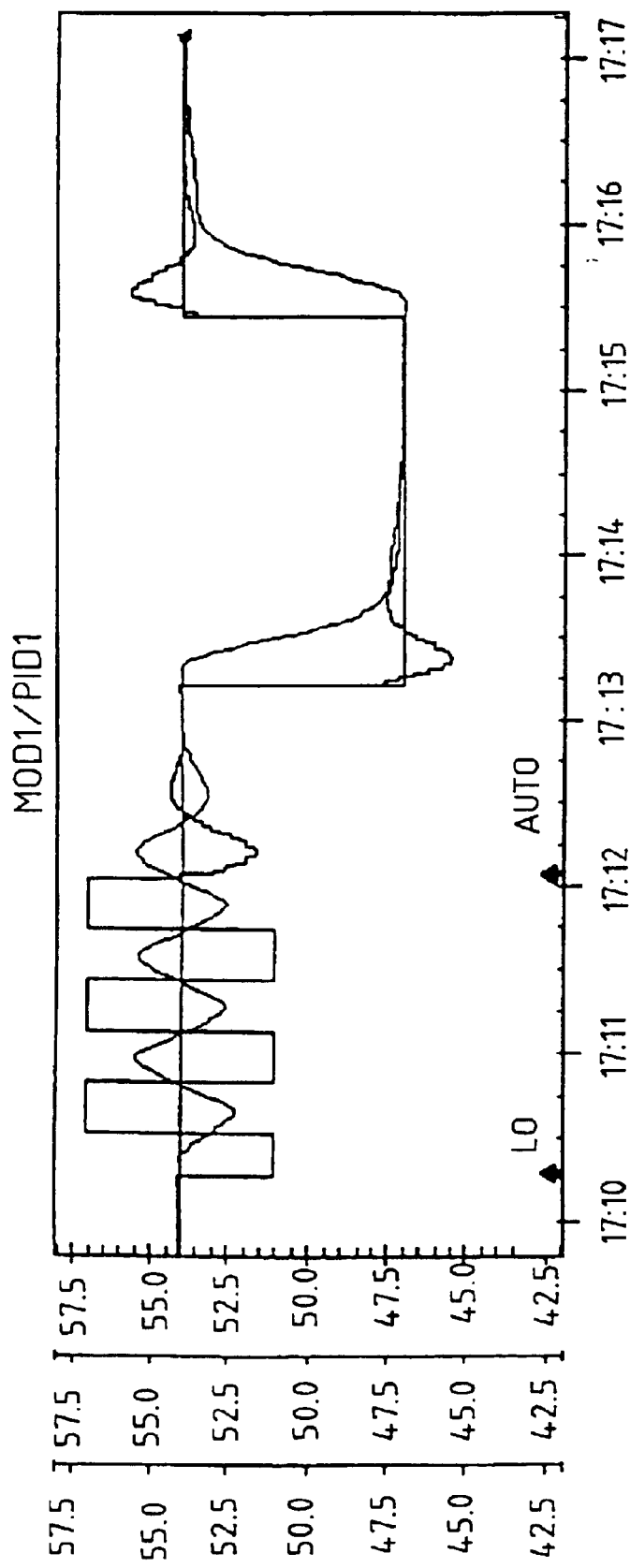
FIG. 3 is a graph showing tuning and step responses for the process with L/T≡0.5, Loop Scan=0.1 sec.
Figure 4:
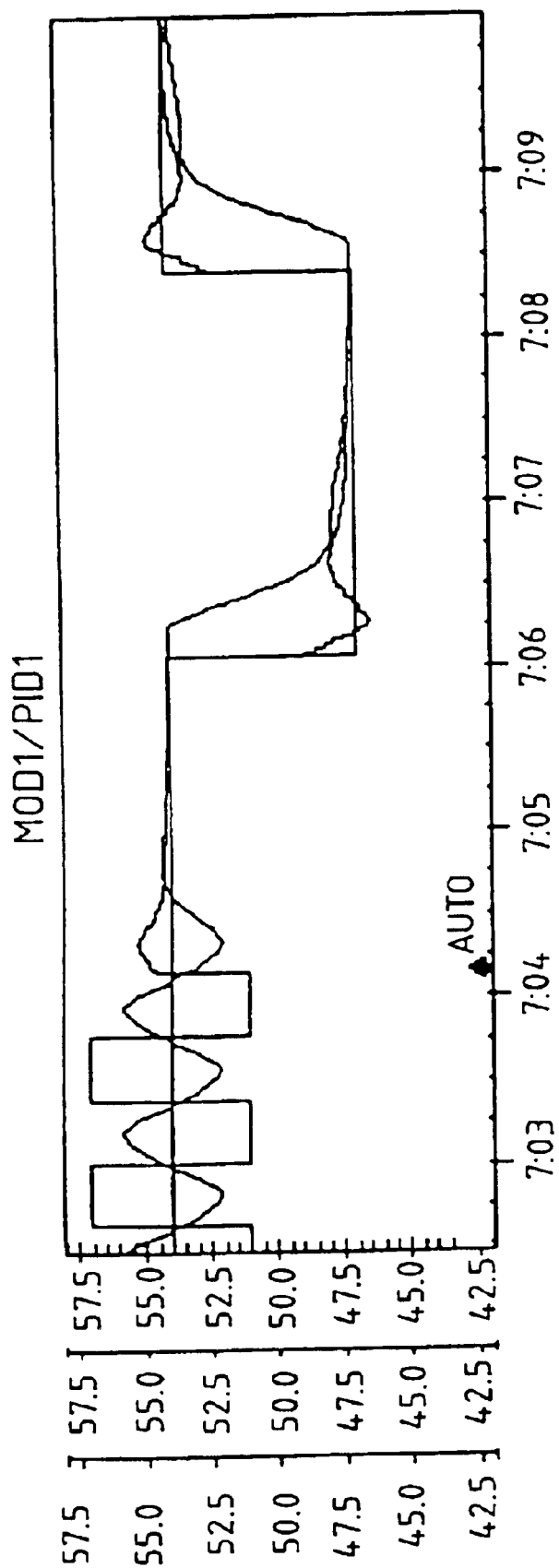
FIG. 4 is a graph showing tuning and step responses for the process with L/T≡0.7, Loop Scan=0.1 sec.

Relay-oscillation tuner system 100 produced the following controller settings: K=1.65, $T_i$=12.36, and $T_d$=1.97, as compared with the IMC calculations: K=1.0, $T_i$=12.5, and $T_d$=1.97. FIG. 3 shows a graph with L increased up to 5 sec. and FIG. 4 shows L increased up to or 8 sec. In both FIG. 3 and in FIG. 4, step responses are similar to model-based tuning, although integral action is somewhat weaker than needed for IMC response. That is, the relay oscillation tuner resulted in $T_i$=15.7 and 18.37; whereas IMC calculations yielded 14.0 and 15.5, respectively.

Figure 5:
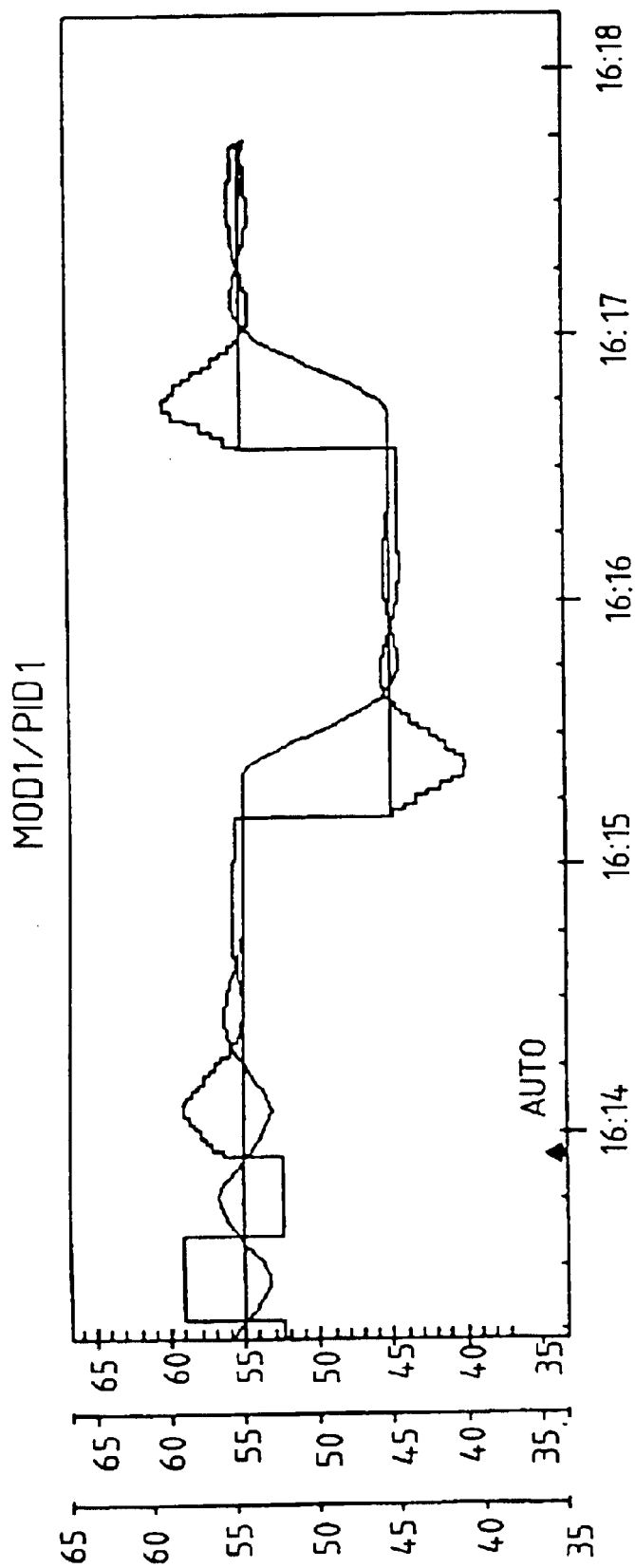
FIG. 5 is a graph showing tuning and step responses for the process with L/T≡0.7, Loop Scan=0.1 sec, with a fast response.

A tuner design according to the nonlinear approaches incorporated in one embodiment of the invention allows the user to make adjustments to tuning performance by selecting Slow, Normal, and Fast response selections. For example, FIG. 5 shows the loop step response for process L/T=0.7 with Fast selection. Using the speed selection increases the general flexibility of the design by better fitting the tuning response to specific conditions and requirements. One of ordinary skill in the art would appreciate that a DeltaV™ system manufactured by Fisher-Rosemount Systems, Inc. implemented in a Windows NT application program or other appropriate program is capable of implementing the adjustable response selections.

Figure 6:
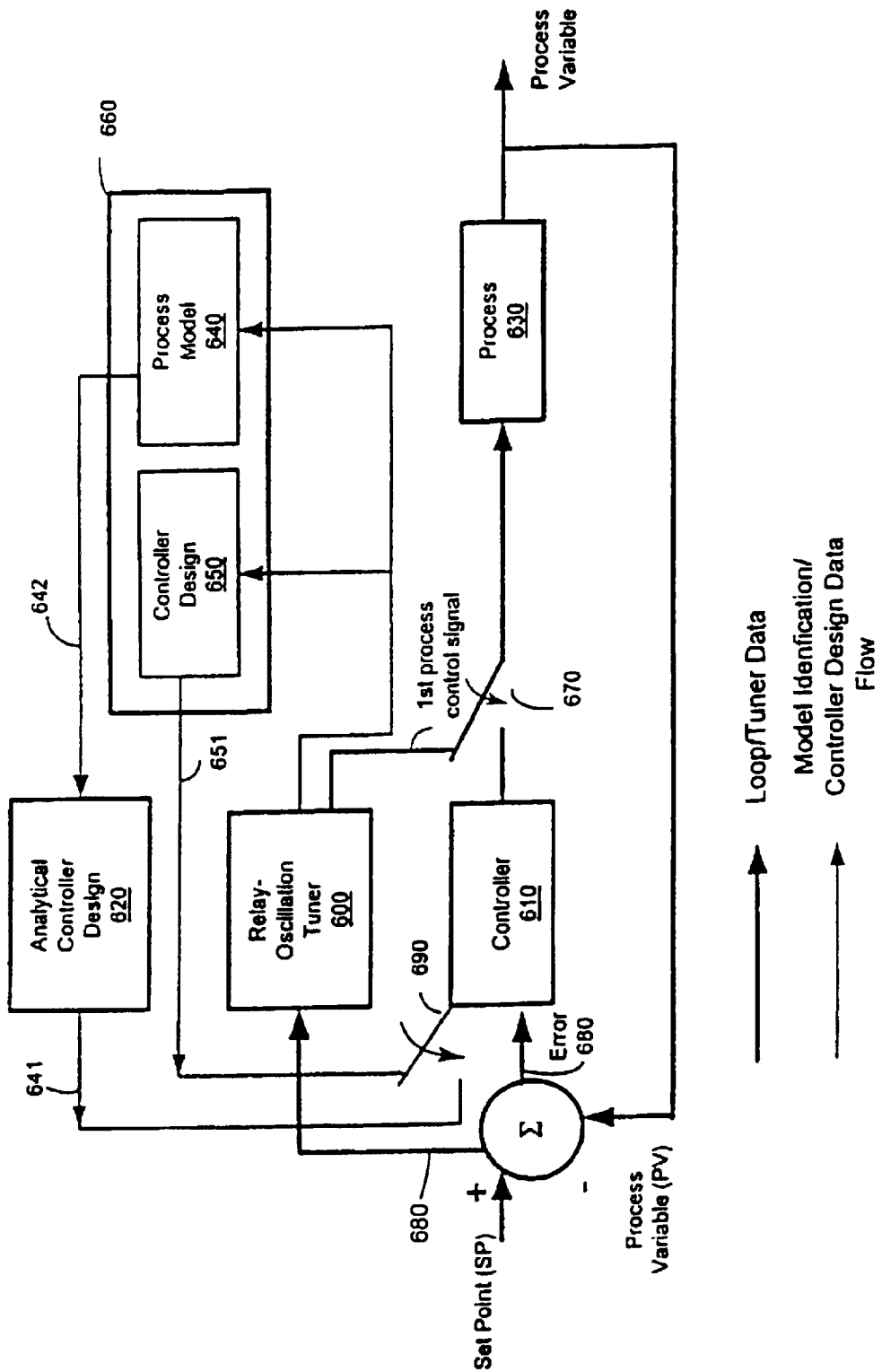
FIG. 6 is a diagram showing a neural network assisted tuner.

Referring now to FIG. 6, a relay-oscillation tuner block schematic is shown that optionally uses the new nonlinear approaches in accordance with an embodiment of the invention. The shown control loop system can include both nonlinear tuning and nonlinear process modeling techniques. Optionally, the system can include linear tuning and nonlinear process modeling techniques or nonlinear tuning and linear process modeling techniques.

As shown in the embodiment of FIG. 6, process 630 is coupled via a switch 670 to either a relay-oscillation tuner 600 or controller 610. The controller 610 is further coupled via a second switch 690 to receive either a first parameter signal 651 from the controller design 650, or a second parameter signal 641 output from analytical controller design 620 and process model 640. The controller 610 provides an output when switchably coupled to process 630. Each of relay-oscillation tuner 600, process model 640, controller design 650, controller 610, process 630 and the analytical controller design 620 may be implemented as software modules, hardware, or a combination of both.

As will be described later, the switch 670 is set to the appropriate process control signal for controlling process 630. Relay-oscillation tuner 600 is also coupled to provide signals to nonlinear module 660, which includes process model 640 and controller design 650. Both the controller design 650 and process model 640 use neural networks, fuzzy logic, nonlinear function or other nonlinear or linear techniques further described below. Relay-oscillation tuner 600 and controller 610 receive an error signal 680 representative of the difference between a set point and a process variable and generates a first process control signal for controlling the process 630. Relay-oscillation tuner 600 also provides signals to nonlinear module 660.

The first parameter signal and the second parameter signal are coupled to controller 610 via switch 690. The output from the process model 640 is shown (coupled to analytical controller design 620. Parameter signal 641 includes process model parameters included in parameter signal 642 that are calculated using nonlinear techniques in process model module 640. In a preferred embodiment, parameter signal 641 further includes controller parameters calculated in analytical controller design 620 using the process model parameters determined in process model module 640 and output in signal 642. One of ordinary skill in the art will appreciate that controller parameters may be generated from process model parameters. Accordingly, analytical controller design 620 optionally applies linear techniques to determine the controller parameters.

Parameter signal 651 output from controller design 650 includes controller parameters calculated using nonlinear techniques. Switch 690 coupled to controller 610 provides an option to choose (1) the controller parameters calculated in analytical controller design 620, along with the process model parameters generated using nonlinear techniques in process model 640; or (2) the controller parameters calculated using nonlinear techniques in controller design 650.

Alternatively, in one embodiment, analytical controller design 620 is removed from the system implementation. With analytical controller design 620 removed, switch 690 may be coupled to both parameter signal 651 and to parameter signal 642. Accordingly, in this embodiment, switch 690 is unnecessary. Thus, controller 610 receives both the controller parameters in parameter signal 651 and the process model parameters in parameter signal 642. Both parameter signal 651 and parameter signal 642 are generated in nonlinear module 660 using nonlinear techniques, such as neural networks, fuzzy logic, nonlinear function or other nonlinear or linear techniques described below.

Neural Network Assisted Tuning

Referring to FIG. 6, controller design 650, controller parameters are determined optionally using a neural network modeling approach. Such a neural network modeling approach improves fitting of three PD controller parameters over a wide range of model parameter changes. Neural network control schemes are generally divided into two broad categories. One approach is to replace a controller using a neural network. The neural network is trained by mimicking a controller or a human expert. The approach uses a separate training for every loop, and thus is not a good candidate for tuner design, which calls for tuning results in a simple and standard tuning procedure. An alternative approach uses neural network as an aid for modeling, control law implementation, or supervisory action. A specific tuner design is shown in FIG. 6. The tuner optionally uses neural networks or other nonlinear techniques described below to compute the process model and PID controller parameters.

Similar to the self-oscillation procedure described relative to FIG. 1, the tuner design of FIG. 6 also employs a self-oscillation procedure. The self-oscillation procedure includes controlling switch 670 to either couple the output of controller 610 to process 630 or couple the output of the relay-oscillation tuner 600 to the process 630. According to one embodiment, controller 610 receives controller parameters from either controller design 650 or analytical controller design 620 via switch 690. In this embodiment, analytical controller design 620 receives process model identification parameters from process model 640. In another embodiment, analytical controller design 620 is removed from the process control loop. Accordingly, controller 610 receives process model identification parameters from process model 640 and controller parameters from analytical controller design 620. Switch 670 either couples controller 610 to process 630 or couples relay-oscillation tuner 600 to process 630. Controller design 650 employs nonlinear techniques to determine controller parameters. One technique described below includes using neural networks.

Figure 7:
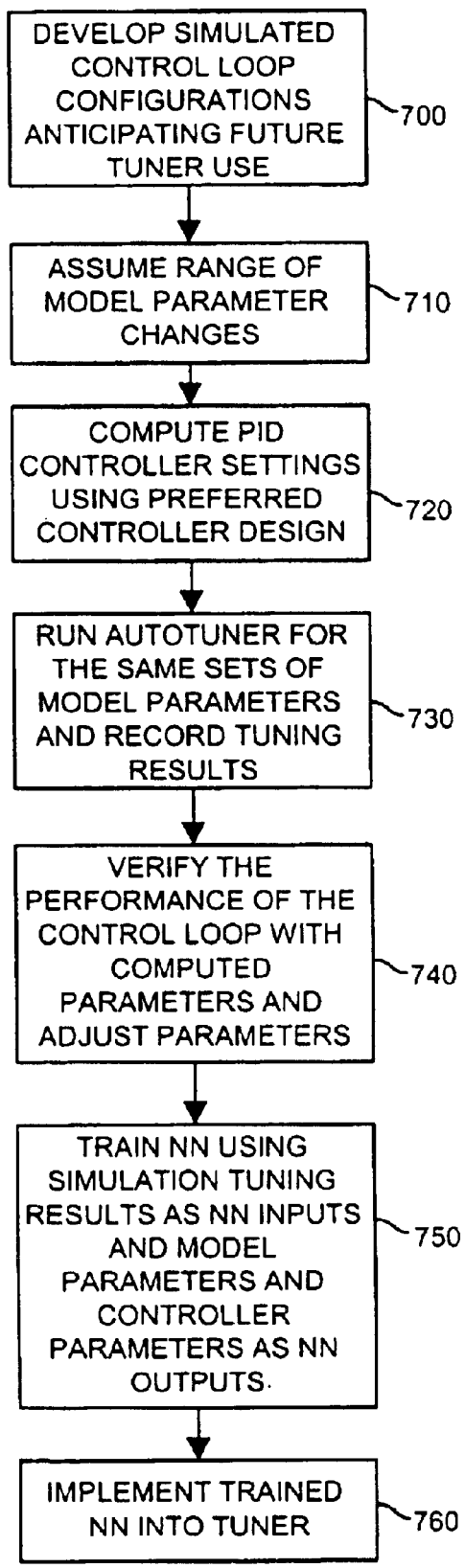
FIG. 7 is a flow diagram showing the steps necessary for developing the neural network in accordance with an embodiment of the present invention.

The procedure of developing neural networks techniques involves several basic steps, shown in FIG. 7. FIG. 7 is a flow diagram demonstrating the neural network steps. Step 700 shows the first step, developing simulated control loop configurations anticipating future tuner use. Normally, either a second-order or third-order plus Dead Time process model is used. Step 710 specifies an assumed range of model parameter changes. Step 720 specifies that a developer compute the PID controller settings for every set of model parameters using IMC rules, Lambda tuning, or any other preferred controller design. Step 730 provides that a developer run the autotuner for the same sets of model parameters and record tuning results: $T_u$, $K_u$, and L. Step 740 provides that a developer verify the performance of the control loop with computed parameters, adjusting parameters as needed. Step 750 provides that a developer train the neural network using simulation tuning results as neural network inputs and model parameters and controller parameters as neural network outputs. Step 760 provides that the developer implement the trained neural network into the tuner.

The neural network described above relative to FIG. 6 and described in FIG. 7 can be any type (Sigmoid or Radial Basis functions). In one embodiment of the present invention, neural network is used with the neuron's transfer function defined by:

$$\text{Out} = \frac{1 - e^{-\text{In}}}{1 + e^{-\text{In}}}$$

as the neuron input. In is a weighted sum of external inputs.

$$\text{In} = \Sigma w_i \text{In}_i$$

The neural network is selectively applied with multiple outputs (outputs K and $T_i$ for the controller neural network and $K_p$ and T for the model neural network) or several single output neural networks. The advantage of using a single output neural network is faster training. Therefore, one embodiment implements a single output neural network. In an illustrative tuner design, the following neural network inputs and outputs are defined:

Inputs: $T_u$, $K_u$, L, Noise Level, Relay Hysteresis, and Scan Rate.

$T_u$, $K_u$, L, and Noise Level are defined during tuning test. Relay Hysteresis and Scan Rate are tuner parameters.

Outputs: K, $T_i$, $T_d$, $K_p$, and T.

K, $T_i$, and $T_d$ constitute PID controller parameters.

$K_p$ and T jointly with L are first-order plus Dead Time process model parameters.

Implementation Issues and Test Results

In one example of the new nonlinear methods, neural network models are implemented to enhance the relay-oscillation Autotuner in a scalable industrial control system. The Autotuner includes two parts: the tuner function block, which is implemented in the controller, and the tuner application. The tuner application is implemented in a Windows NT console or other appropriate console. Neural network models are added to the tuner application. In one embodiment, the neural network models are transparent to the tuner user with the Autotuner having no selections or settings associated with neural networks.

According to the method described herein, the neural network is trained for the second-order plus Dead Time process model. The specification below defines available input and output data for training neural network models:

Process Neural Network Model

Inputs: Ultimate Gain $K_u$, Ultimate Period $T_u$, and Dead Time L defined during the relay tuning experiment.

Outputs: Process Gain 0.5, 1.0, 1.5; Process Time Constant 1 in sec., 1.0, 2.0, 5.0, 10.0, 20.0, 50.0, 100.0, 200.0; Process Time Constant 2 in sec., 1.0, 2.0, 5.0, 10.0: Dead Time in sec., 1.0, 2.0, 5.0, 10.0, 20.0, 50.0, 100.0, 200.0.

Controller Neural Network Model

Inputs: Same as for Process Neural Network model.

Outputs: PID Controller Gain K, Integral Time $T_i$, and Derivative Time $T_d$ computed from process model parameters for the outputs, given above, i.e., Process Gain 0.5, 1.0, 1.5; Process Time Constant 1 in sec., 1.0, 2.0, 5.0, 10.0, 20.0, 50.0, 100.0, 200.0; Process Time Constant 2 in sec., 1.0, 2.0, 5.0, 10.0; Dead Time in sec., 1.0, 2.0, 5.0, 10.0, 20.0, 50.0, 100.0, 200.0.

Experimental Testing

Figure 8:
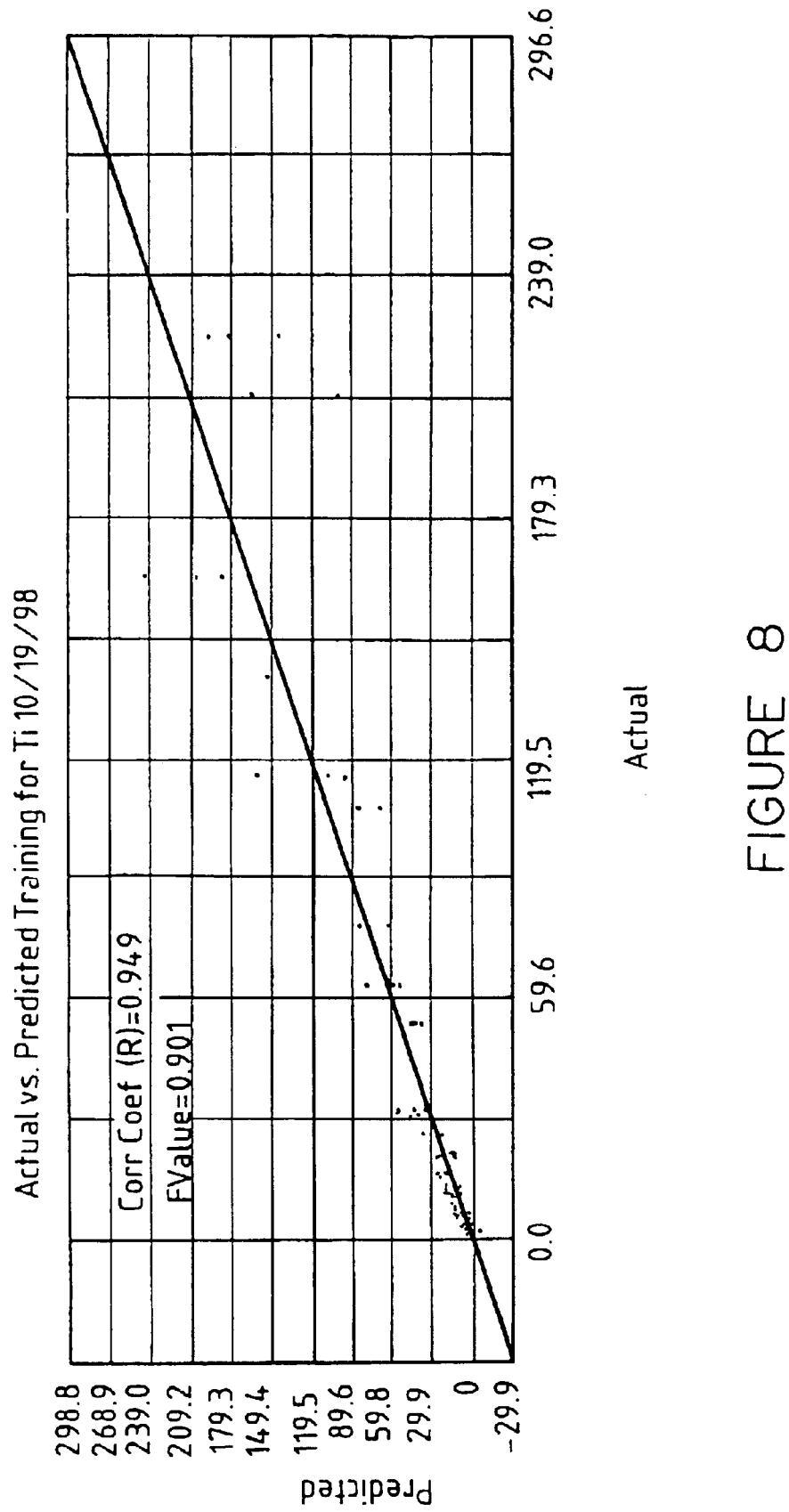
FIG. 8 is a graph showing the results predicted by Neural Network vs. Actual/Required Integral Time using the method according to an embodiment of the present invention.
Figure 9:
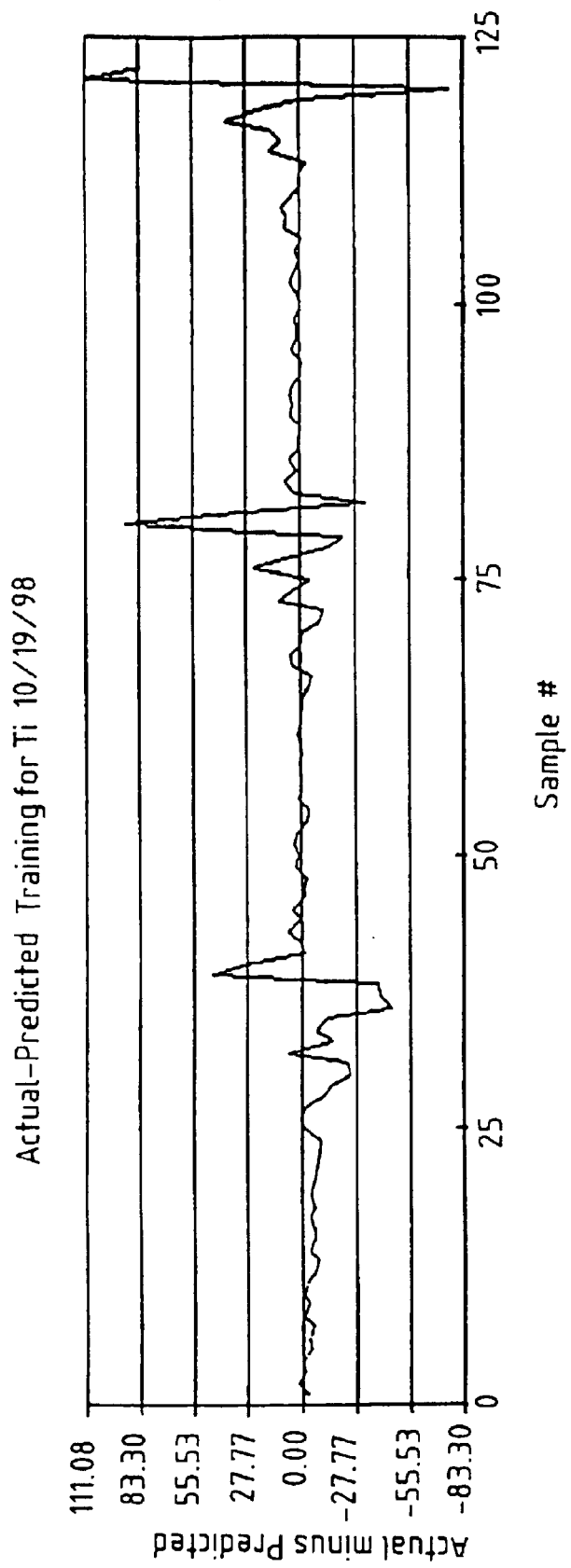
FIG. 9 is a graph showing the results predicted by Neural Network Model Integral Time—Actual/Required Integral Time using the method according to an embodiment of the present invention.

An experimental simulation tuning test was run 142 times, which is understood by those skilled in the art to represent the approximate minimum number of samples suitable for training a simple neural network. The samples gave a good correlation coefficient and, in general, close values of the predicted output to the required output. The graphs of the results for $T_1$ are given in FIGS. 8 and 9.

In some intervals of the predicted parameters range, the prediction error was unacceptable. There are two specific cases of this effect. One case involves small values of predicted controller parameters relative to prediction error. In this case, predicted parameter error even as small as 1% of the maximum value gives unacceptable parameters. In particular, referring to FIG. 8, when the actual value is close to the prediction error, $T_i$ can be zero or even negative.

Another error situation occurs when few samples are included in the subrange. For example, when a user wants to extend the range of neural network modeling by making only a few simulations for an extended subrange, such as $T_i$>50.0 in FIG. 8, an error could occur.

Neural Network Tuning Rules

To prevent anomalies, according to the illustrative nonlinear techniques, the neural network tuning models uses the following steps/rules. First, collect as many samples as possible. Collect at least the minimum number of samples required for a simple model. Second, select the range for the predicted parameter so that a parameter value within range changes not more than a few times, (about five). If predicted values change more than a few times (about 15), split the range of parameter changes into several subranges and develop several neural network models. Third, give special attention to small predicted values. If predicted values are comparable in size to prediction error, make a separate neural network model for the small values.

Figure 10:
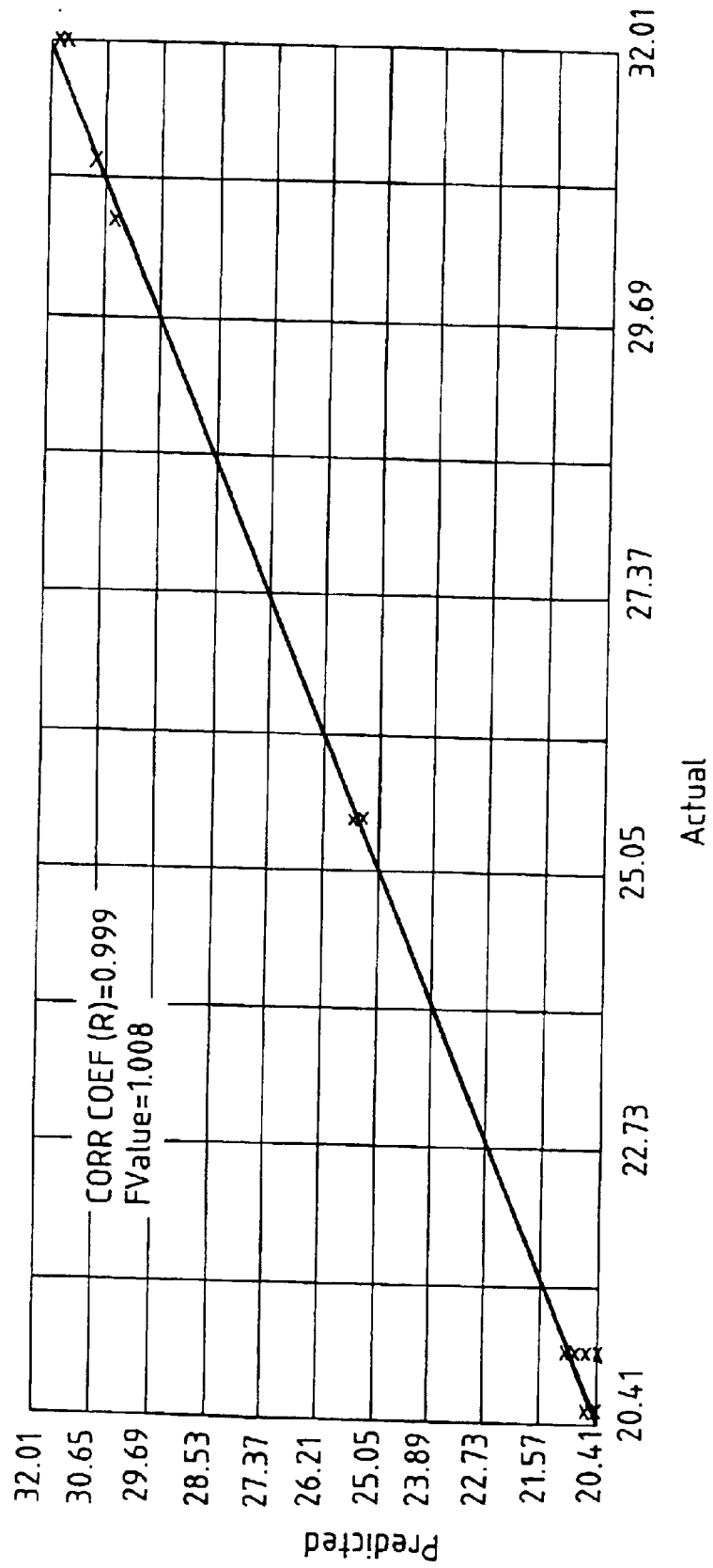
FIG. 10 is a graph of the results predicted by Neural Network Model for the Subrange of $T_i$ Values 15 to 33 according to an embodiment of the present invention.

For example, a model was developed with a narrowed subrange of $T_i$ values from 15 to 33 (instead of 1 to 320 in the full range). Despite fewer than the minimum number of samples, the prediction was much better than attained by the original model for the whole range. A graph of the neural network model prediction for the subrange of $T_i$ is given in FIG. 10. The prediction error relative to IMC parameters is below 5%, while an error of the nonlinear function estimator for the test cases L/T>0.5 exceeds 12.0%.

Linear and Nonlinear Corrective Functions for Process Model Identification

Referring back to FIG. 6 in combination with Equations (1) and (3) (reproduced below), the use of linear and nonlinear corrective functions for process model identification is described. As described above, process model 640 provides process model parameters optionally using linear or linear corrective functions. The techniques described below apply linear, nonlinear function, neural networks and fuzzy logic as corrective functions for process model identification performed in process model 640.

The process time constant ($T_c$) produced by Equations (1) and (3) are significantly shorter for smaller process apparent Dead Time to ultimate gain ratios $$\left(\frac{T_d}{T_u}\right)$$

and an excessive process time constant ($T_c$) for process apparent Dead Time to ultimate period ratios $$\left(\frac{T_d}{T_u}\right)$$

bigger than 0.25 as shown in Table 1 and 2.

$$T_c = \frac{T_u}{2\pi} \tan\left(\pi - \frac{2\pi T_d}{T_u}\right) \quad (1)$$

$$T_c = \frac{T_u}{2\pi}\left(\tan\frac{\pi}{3} + 2\left(\pi - \frac{2\pi T_d}{T_u} - \frac{\pi}{3}\right)\right) \quad (3)$$

A corrective function $f(T_u/T_d)$ applied to the identified process time constant, $$T_c(\text{corrected}) = T_c(\text{identified}) f(T_u/T_d)$$

should have $f(T_u/T_d)$ values above 1 for small $$\frac{T_d}{T_u}$$

and less than 1 for $$\frac{T_d}{T_u}$$

greater than 0.25.

A simple linear function with coefficients developed from simulated tests corrects for the process time constant according to Equation (12):

$$T_c(\text{corrected}) = T_c\left(0.3\left(\frac{T_u}{T_d} - 4.8\right) + 1.05\right) \quad (12)$$

For a nonlinear function, a sigmoid expression provides a smooth transition between two different values. Sigmoid corrective function is reasonably well defined by knowing minimum and maximum values. The following Equation (13) for process time constant estimate was developed based on a small set of simulated data:

$$T_c(\text{corrected}) = \quad (13)$$

$$T_c\left[0.8 + \frac{0.4}{1 + \exp-\left(\frac{T_u}{L} - 4.6\right)/0.2} + \frac{1.0}{1 + \exp-\left(\frac{T_u}{L} - 6.0\right)/0.3}\right]$$

Equation 12 gives the value of the coefficient used for $T_c$ computation, which varies from a minimal value of 0.8 to a maximum value of 2.2. After correcting time constant, process static gain is recomputed using Equation (2), reproduced below:

$$K_s = \frac{1}{K_u}\sqrt{1 + \frac{4\pi^2 T_c^2}{T_u^2}} \quad (2)$$

Tuning and calculation results for the process with static gain 1.0 are compiled in Table 1, and with static gain 0.5 in the Table 2. In both cases, the process is modeled as a second order with T1=10 sec, T2=2 sec plus dead time shown in column Td. Identifier approximated the model by a first order plus dead time model (Td identified). Model parameters shown are initially identified (Td, Kp, and Tc) and corrected by using linear and nonlinear estimating formulas (Kp and Tc)

Application of both corrective functions significantly improved process model identification.

Fuzzy Logic Assisted Identification

A typical Fuzzy Logic Controller is a type of nonlinear controller. Unique features of the Fuzzy Logic controller are the controller operation and the controller development. Fuzzy control algorithm is defined by linguistic rules. Controller input parameters are represented by Fuzzy Sets. Controller operation is well illustrated by using control surface, particularly for controllers using input parameters.

The procedure for developing FL corrective function is similar to the procedure for developing a fuzzy logic controller. The following method is for determining a FL corrective function.

First, assume the corrective function for process model time constant has the form:

$$Tc(\text{corrected}) = Tc[1 + \Delta F] \quad (14)$$

where $\Delta F$ is fuzzy logic corrective function. Function value corresponds to the incremental fuzzy logic controller output. The potential advantage of using a fuzzy logic function over an ordinary nonlinear function is that the fuzzy logic function is a more flexible function design and an easy way to include two or more arguments.

Second, apply the function with two arguments and use Tu/Td ratio as a first argument and Ultimate Gain as a second argument.

$$\Delta F = f\left(\frac{T_u}{T_d}, K_0\right) \quad (15)$$

Figure 11:
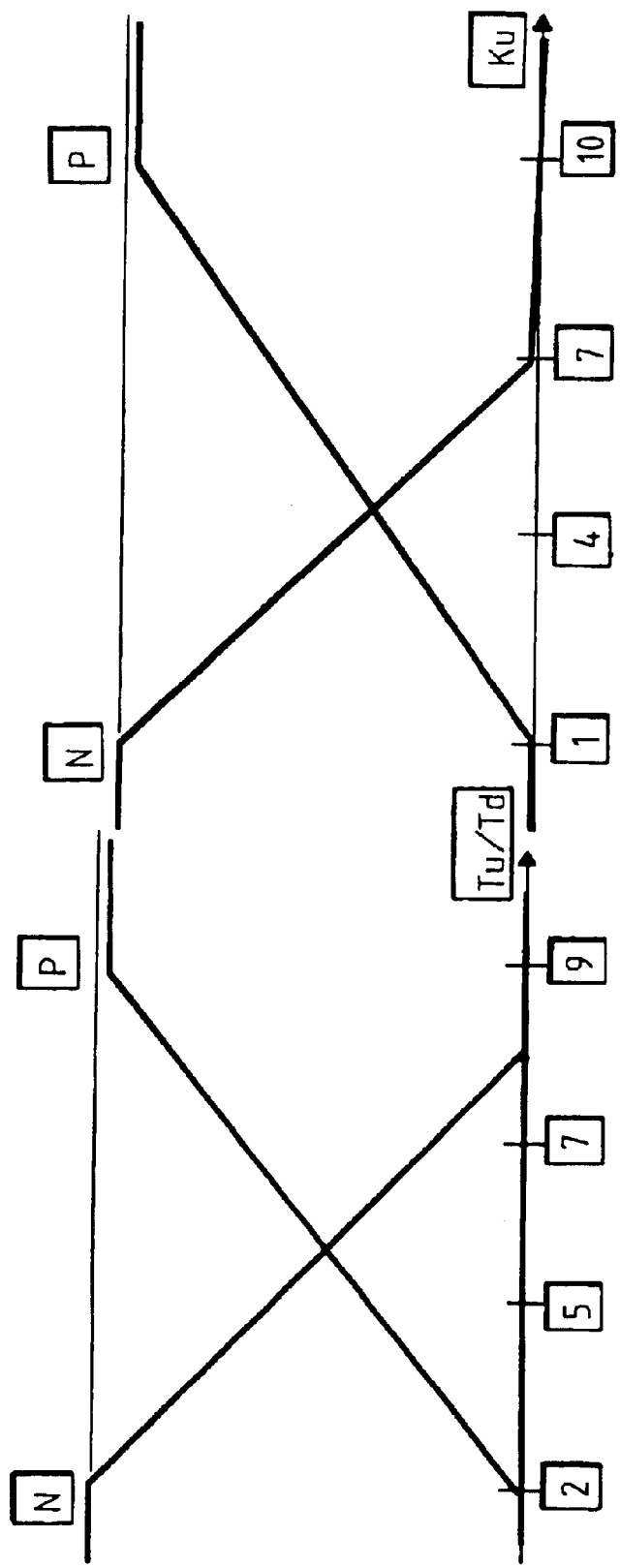
FIG. 11 is a graph of input membership functions within an embodiment of the present invention.

It is possible to use various number and types of membership functions. For the sake of ease of implementation, use simple triangle membership functions on the input parameters and singleton functions on the output signals. FIG. 11 and Table 3 show details of the fuzzy logic corrective function design. Referring to Table 3, P represents positive and N represents negative.

TABLE 1

Process model identification results for the model with Kp = 1.0

| Ultimate Gain | Ultimate Period | Td In model | Td identif | Tc identif | Kp identif | Tc Corr linear funct | Kp Corr linear funct | Tc Corr sigmoid funct | Kp Corr sigmoid funct |
|---|---|---|---|---|---|---|---|---|---|
| 7.812 | 9.55 | 1 | 1.24 | 4.921 | .434 | 9.374 | .799 | 10.42 | .887 |
| 5.65 | 13.4 | 2 | 2.2 | 6.77 | .589 | 9.728 | .826 | 10.57 | .895 |
| 3.7 | 19.85 | 4 | 4.2 | 9.7 | .879 | 10.65 | .949 | 8.92 | .809 |
| 2.85 | 25.5 | 6 | 6.2 | 12.28 | 1.11 | 10.35 | .960 | 10.38 | .963 |
| 2.08 | 35.5 | 10 | 10.0 | 14.4 | 1.319 | 9.72 | .956 | 11.9 | 1.12 |

TABLE 2

Process model identification results for the model with Kp = 0.5

| Ultimate Gain | Ultimate Period | Td In model | Td identif | T identif | Kp identif | Tc Corr linear funct | Kp Corr linear funct | Tc Corr sigmoid funct | Kp Corr sigmoid funct |
|---|---|---|---|---|---|---|---|---|---|
| 12.84 | 9.75 | 1 | 1.142 | 5.064 | .266 | 10.99 | .55 | 10.95 | .55 |
| 8.78 | 13.4 | 2 | 1.838 | 6.879 | .384 | 12.36 | .66 | 14.34 | .77 |
| 6.43 | 19.9 | 4 | 3.53 | 10.0 | .514 | 12.99 | .65 | 11.69 | .59 |
| 5.24 | 25.45 | 6 | 5.748 | 12.388 | .614 | 11.59 | .57 | 10.68 | .53 |
| 3.96 | 35.7 | 10 | 9.735 | 15.315 | .725 | 10.84 | .54 | 12.70 | .61 |

TABLE 3

Corrective function inference rules.

| UG OR Up/L | N | P |
|---|---|---|
| N | N | P |
| P | NS | PL |

Negative: N = −.4,
Negative Small: NS = −.2,
Positive: P = .5,
Positive Large: PL = 1.2

Defuzzification on the output signal applies to singleton membership functions.

TABLE 4

Comparison of identified time constant and process gain obtained by various corrective functions.

| Tc in model | Kp in model | Tc Corr linear function | Tc Corr Sigmoid function | Tc Corr FL | Kp Corr linear function | Kp Corr Sigmoid function | Kp Corr FL |
|---|---|---|---|---|---|---|---|
| ~11 | 1 | 9.374 | 10.42 | 10.13 | .799 | .887 | .86 |
| ~11 | 1 | 9.728 | 10.57 | 9.55 | .826 | .895 | .81 |
| ~11 | 1 | 10.65 | 8.92 | 10.00 | .949 | .809 | .89 |
| ~11 | 1 | 10.35 | 10.38 | 10.29 | .960 | .963 | .95 |
| ~11 | 1 | 9.72 | 11.9 | 10.30 | .956 | 1.12 | .99 |
| ~11 | .5 | 10.99 | 10.95 | 11.14 | .55 | .55 | .56 |
| ~11 | .5 | 12.36 | 14.34 | 13.54 | .66 | .77 | .73 |
| ~11 | .5 | 12.99 | 11.69 | 13.53 | .65 | .59 | .68 |
| ~11 | .5 | 11.59 | 10.68 | 12.38 | .57 | .53 | .61 |
| ~11 | .5 | 10.84 | 12.70 | 12.16 | .54 | .61 | .59 |

Experimental Results of Fuzzy Logic Simulation

The Fuzzy Logic corrective function gave time constant and gain estimate comparable to the estimates obtained with linear and nonlinear corrective functions.

According to Table 4, a relay oscillation identifier with added corrective functions provides first order plus dead time model, which can be used for PID controller model based tuning calculations.

Both nonlinear functions and neural network models significantly improve relay-oscillation based tuning rules. Adhering to the specified principles of developing neural network tuning models, neural network modeling provides a number of advantages. A user may implement any preferred tuning rules, including but not limited to Lambda or IMC, and use the same methodology to develop neural network tuning models. Developed in simulation, a neural network model can accommodate specific features of the tuner design. Scan rate and noise level affecting controller design are easily added as input parameters for prediction.

Other Embodiments

Although the systems and methods described herein use a tuner that calculates the Ultimate Period and the Ultimate gain of a process in order to develop information, any other types of tuners that measure any process characteristics are usable, including open-loop tuners and other closed-loop tuners. Furthermore, the factors determined and control parameters using the system and methods disclosed may be entered either by a user or automatically.

Further, the elements shown in any schematic block diagrams referred to herein may be embodied in hardware or implemented in an appropriately programmed digital computer or processor that is programmed with software, either as separate programs or as modules of a common program.

Although the present invention has been described with reference to specific examples, which are intended to be illustrative and not delimiting of the invention, it will be apparent to those of ordinary skill in the art that changes, additions and/or deletions may be made to the disclosed embodiments without departing from the spirit and scope of the invention.

What is claimed is:

1. A system for tuning a process control loop, the system comprising:
    a tuner for receiving an error signal representative of a difference between a set point and a process variable to generate a first process control signal for controlling the process and to generate a set of process characteristic signals characterizing the process;
    a nonlinear module for applying a nonlinear procedure to the set of process characteristic signals to generate at least one controller parameter signal;
    a controller for receiving the error signal and the at least one controller parameter signal from the nonlinear module, the controller generating a second process control signal for controlling the process;
    and a switch coupled to the process for coupling one of the tuner and the controller to the process to select the appropriate process control signal for controlling the process.

2. The system of claim 1 wherein the nonlinear module includes a nonlinear controller design module for providing a nonlinear estimation of a plurality of controller tuning parameters.

3. The system of claim 2 wherein the controller is further coupled to receive the nonlinear estimation of controller tuning parameters from the nonlinear controller design module.

4. The system of claim 2 wherein the nonlinear controller design module allows adjustments to the controller, the adjustments altering a response speed of the controller.

5. The system of claim 1 further comprising an analytical controller design module coupled to the nonlinear module, the analytical controller design module capable of providing a plurality of controller parameters to the controller based on a plurality of model identification parameters received from the nonlinear module.

6. The system of claim 1 wherein the controller is a proportional, integral, and derivative feedback controller.

7. The system of claim 1 wherein the nonlinear module includes at least one neural network module.

8. The system of claim 7 wherein the neural network module uses a function selected from the group consisting of a sigmoid function and a radial basis function.

9. The system of claim 7 wherein the neural network module uses a sigmoid function wherein a transfer function is given by $$\text{Out} = \frac{1 - e^{-In}}{1 + e^{-In}},$$

wherein In is a weighted sum of a plurality of external inputs of the form $In = \Sigma w_i In_i$.

10. The system of claim 1 wherein the nonlinear module includes a nonlinear process identification module and a nonlinear controller design module, and wherein an output from the nonlinear process identification module and an output from the nonlinear controller design module are coupled to the controller.

11. The system of claim 1 wherein the nonlinear module includes a fuzzy logic module.

12. The system of claim 1 wherein the controller parameter signal includes a plurality of control parameters using nonlinear estimators of a plurality of tuning parameters for tuning the process control loop.

13. The system of claim 12 wherein the nonlinear module calculates the plurality of control parameters using nonlinear estimators using nonlinear functions to create nonlinear estimators of the plurality of tuning parameters.

14. The system of claim 13 wherein the nonlinear function includes a neural network using a sigmoid function.

15. The system of claim 14 wherein heuristic coefficients are used with the sigmoid function to provide parameters including an integral time, a gain and a derivative time.

16. The system of claim 12 wherein the nonlinear module calculates the plurality of control parameters using nonlinear estimators using neural networks to estimate a set of relay oscillation tuning parameters.

17. The system of claim 13 wherein the nonlinear module calculates the plurality of control parameters using nonlinear estimators using fuzzy logic to estimate a set of relay oscillation tuning parameters.

18. A method for tuning a process control loop, the method comprising:
  receiving an error signal representative of a difference between a set point and a process variable;
  generating a set of process characteristic signals characterizing the process from the error signal;
  applying a nonlinear procedure to the set of process characteristic signals to generate at least one controller parameter signal and to generate process model identification parameters associated with the at least one controller parameter signal;
  generating a process control signal for controlling a process based on the error signal and the at least one controller parameter signal; and
  controlling the process using the process control signal.

19. A system for tuning a process control loop, the system comprising:
  a computer readable memory; and
  software stored on the computer readable memory operable to:
    receive an error signal representative of a difference between a set point and a process variable;
    generate a set of process characteristic signals characterizing the process;
    apply a nonlinear procedure to the set of process characteristic signals to generate at least one controller parameter signal and to generate process model identification parameters associated with the at least one controller parameter signal;
    generate a process control signal for controlling a process based on the error signal and the at least one controller parameter signal; and
    control the process using the process control signal.

* * * * *

UNITED STATES PATENT AND TRADEMARK OFFICE
CERTIFICATE OF CORRECTION

PATENT NO. : 6,847,954 B1
DATED : January 25, 2005
INVENTOR(S) : Wilhelm K. Wojsznis et al.

It is certified that error appears in the above-identified patent and that said Letters Patent is hereby corrected as shown below:

Title page,
Item [54], Title, please delete "CONTROL-LOOP" and insert
-- CONTROL LOOP --.

Column 2,
Lines 55, 57, 59 and 61, please delete "≡" and insert -- ≅ --.

Column 6,
Line 17, please delete "b1≡0.6, b2≡1.0, c1≡7.0, c2≡4.0, d1≡0.125, d2≡1.0" and insert
-- b1 ≅ 0.6, b2 ≅ 1.0, c1 ≅ 7.0, c2 ≅ 4.0, d1 ≅ 0.125, d2 ≅ 1.0 --.
Line 46, please delete "≡" and insert -- ≅ --.

Column 7,
Line 23, please delete "(coupled" and insert -- coupled --.

Column 8,
Lines 52-54, please delete "$\frac{1-e^{-ln}}{1+e^{-ln}}$" and insert -- $\frac{1-e^{-ln}}{1+e^{-ln}}$ --

Column 9,
Line 30, please delete "10.0:" and insert -- 10.0 --.
Line 48, please delete "$T_1$" and insert -- $T_i$ --.

Column 12,
Line 29, please delete "$K_0$" and insert -- $K_u$ --.
Line 33, please delete "number" and insert -- numbers --.

Signed and Sealed this

Eleventh Day of October, 2005

JON W. DUDAS
*Director of the United States Patent and Trademark Office*